United States Patent
Eshelman et al.

(10) Patent No.: US 6,931,656 B1
(45) Date of Patent: Aug. 16, 2005

(54) VIRTUAL CREATURE DISPLAYED ON A TELEVISION

(75) Inventors: Larry J. Eshelman, Ossining, NY (US); Srinivas Gutta, Buchanan, NY (US); John Milanski, Tarrytown, NY (US); Hugo J. Strubbe, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 776 days.

(21) Appl. No.: 09/686,831

(22) Filed: Oct. 11, 2000

(51) Int. Cl.[7] .......................... H04N 5/445; G06T 13/00
(52) U.S. Cl. .......................... 725/37; 345/473; 348/563
(58) Field of Search .............................. 725/9, 10, 18, 725/38, 40, 46, 37, 14; 345/440, 473, 474, 345/475, 706; 348/515, 553, 563, 578, 589

(56) References Cited

U.S. PATENT DOCUMENTS

| | | | |
|---|---|---|---|
| 5,393,073 A | * | 2/1995 | Best |
| 6,184,937 B1 | * | 2/2001 | Williams et al. |
| 6,208,357 B1 | * | 3/2001 | Koga et al. |
| 6,314,569 B1 | * | 11/2001 | Chernock et al. |
| 6,445,398 B1 | * | 9/2002 | Gerba et al. ................. 375/721 |
| 6,466,213 B2 | * | 10/2002 | Bickmore et al. .......... 345/473 |
| 6,513,031 B1 | * | 1/2003 | Fries et al. ..................... 707/3 |
| 6,513,160 B2 | * | 1/2003 | Dureau |
| 2002/0010584 A1 | * | 1/2002 | Schultz et al. |

FOREIGN PATENT DOCUMENTS

| | | | |
|---|---|---|---|
| EP | 0871137 A1 | 10/1998 | ........... G06F 19/00 |
| WO | WO9427677 | 12/1994 | ............ A63B 9/24 |

* cited by examiner

*Primary Examiner*—Krista Bui
(74) *Attorney, Agent, or Firm*—Gregory L. Thorne

(57) ABSTRACT

An animated virtual creature is generated on a display such as a television set, in order to simulate a pet or to facilitate user interface functions. In one embodiment, one or more signals corresponding to the program being watched are monitored. When certain events are detected based on this monitoring, the animated character is controlled in a manner that corresponds to the detected event. In another embodiment, the animated virtual creature responds to program selections made by a user in a program recommendation system.

18 Claims, 3 Drawing Sheets

VIRTUAL CREATURE DISPLAYED ON A TELEVISION

BACKGROUND OF THE INVENTION

1. Field of the Invention

The invention relates to systems and methods for the generation of animation on a media output appliances, especially television sets.

2. Background

The "Tamagotchi" is a keychain-sized device that includes a microcontroller, a small display screen, and a number of push buttons. The program that runs on the controller generates a "virtual pet" on the display. The user can "feed" and "play with" the pet by pressing the appropriate buttons. If the user takes good care of the pet, the pet will thrive and grow. If the user neglects the pet, the pet will get sick and may die.

Similar "virtual creatures" have also been implemented as programs that run on home computers (e.g., IBM PCs and Apple Macintosh computers). Fin fin, which was created by Fujitsu, is an example of this type of virtual pet. Fin fin includes a sensor device that enables the program to "see" and "hear" the user, so that Fin fin can react to the user. The user may also interact with Fin fin by pressing keys on the computer's keyboard. Fin fin is designed to exhibit intelligent emotions and personality and to develop a "relationship" with the user.

All of the "experiences" of these artificial pets, however, are initiated by the user (e.g. when the user feeds or plays with the Tamagotchi, or whistles at the Fin fin). As a result, none of the above-described virtual pets could share an experience with the user.

Another type of conventional virtual creature is Microsoft's "office assistant", which is an animated character that provides help to users in many Microsoft software applications. In a popular incarnation, the office assistant resembles a paper clip with eyes. Depending on the context from which the office assistant was invoked, the animated movements of the office assistant will differ. While the actions of the office assistant depend on the context of the program that is currently running, the animations are initiated in response to inputs provided by a user (using e.g., a keyboard or a mouse), and not to changes in the information that is being viewed by the user.

A virtual creature that overcomes the above-described deficiencies of the prior art would provide a higher level of entertainment and enjoyment to users.

SUMMARY OF THE INVENTION

Imagine a virtual pet like Fin fin. However, imagine that this character "lives" inside a television, watches television programming with its owner, responds to what is on, and makes recommendations for further viewing. Also, imagine that the owner can interact with the pet. If the owner responds to the pet, the pet is happy. If the owner ignores the pet, the pet becomes increasingly unhappy. For example, if the pet makes program recommendations, which the owner routinely ignores, the pet may become depressed. The invention is similar to the prior art interactive artificial life form, Fin fin, but in the inventive system, the artificial life form attaches to the system to provide enhanced utility by, for example, responding to the current programming and suggesting other programs to watch. Various other kinds of entertaining and useful features are made possible and are discussed below.

One aspect of the present invention is directed to a method of providing an animated viewing companion on a display while a viewer is watching a program. In this method, a video program is shown on the display, and an animated character is generated on a portion of the display. At least one signal, which corresponds to the program being watched, is monitored. Based on this monitoring, it is determined when a predetermined event has occurred, and the animated character is then controlled accordingly.

Another aspect of the present invention is directed to a method of providing an animated viewing companion on a display while a viewer is watching a program, where the program has an audio component and a synchronized video component. In this method, the video component of the program is displayed on the display, and an animated character is generated on a portion of the display. Based on a signal corresponding to the audio component of the program, it is determined when a first predetermined audio event has occurred and when a second predetermined audio event has occurred. The animated character is controlled based on these determinations.

Another aspect of the present invention is directed to a method of providing an animated character on a display while a viewer interfaces with a program recommendation system. In this method, an animated character is generated on the display, and a selection of a program is accepted from a user. The user's selection is compared to a stored profile that is based on previously made program selections. The animated character is then controlled based on this comparison.

DETAILED DESCRIPTION OF THE PREFERRED EMBODIMENTS

Figure 1:
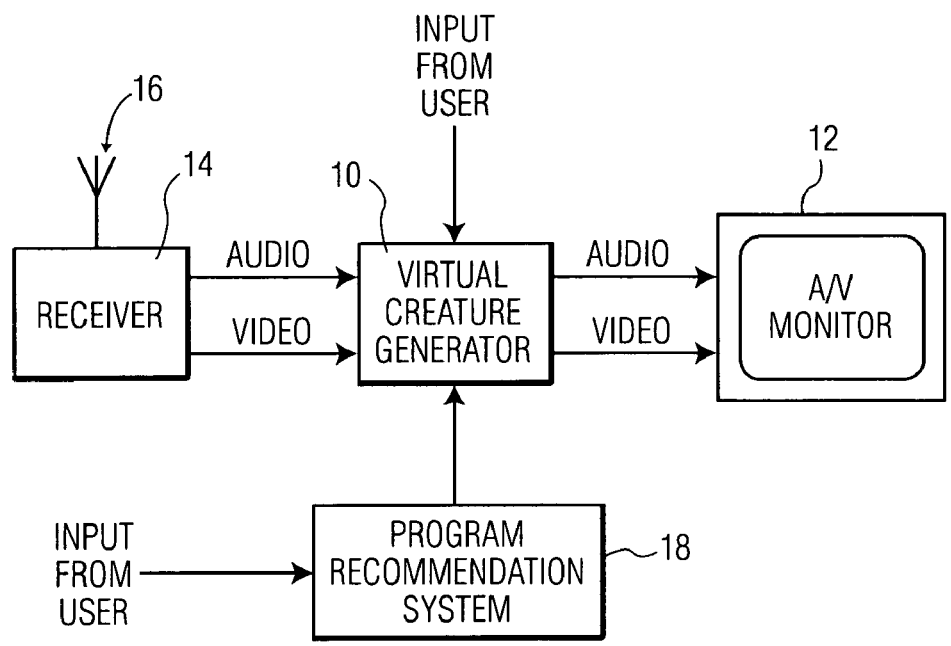
FIG. 1 is a block diagram of a television set-up that incorporates a virtual creature generator in accordance with an embodiment of the present invention.

FIG. 1 is a block diagram of a television set-up. It includes a signal source, such as receiver 14, which receives a broadcast signal from an antenna 16 or a cable (not shown). The signal source generates audio and video outputs. Of course, alternative signal sources (e.g., VCRs, DVD players, video cameras, etc.), may also be substituted for the illustrated receiver 14.

The audio and video outputs from the signal source (e.g., receiver 14) are applied to a virtual creature generator (VCG) 10. The VCG 10 also receives user interface inputs from the user. Based on the received audio and video signals, the VCG 10 generates an audio and video output, which are applied to a monitor 12. The monitor 12 generates a display based on the video signal received from the VCG 10, and generates an audible output based on the audio signal received from the VCG. Any suitable monitor technology may be used including, for example, LCD, CRT, and LED technologies.

While the FIG. 1 embodiment shows the receiver 14, the VCG 10, and the monitor 12 as discrete units, it will be appreciated by persons skilled in the art that these units may be integrated together in alternative embodiments. In addition, it will be appreciated that the interconnections between the receiver 14, monitor 12, and VCG 10 may be accomplished using various alternative signal formats. For example, instead of sending audio and video signals from the VCG 10 into the monitor 12, the audio and video components may be combined into a single RF signal applied to an RF input (not shown) on the monitor 12. A program recommendation system 18, as discussed further below, optionally provides data to the VCG 10 to permit output of recommendations by an animated multimedia creature generated by the VCG 10.

Figure 2:
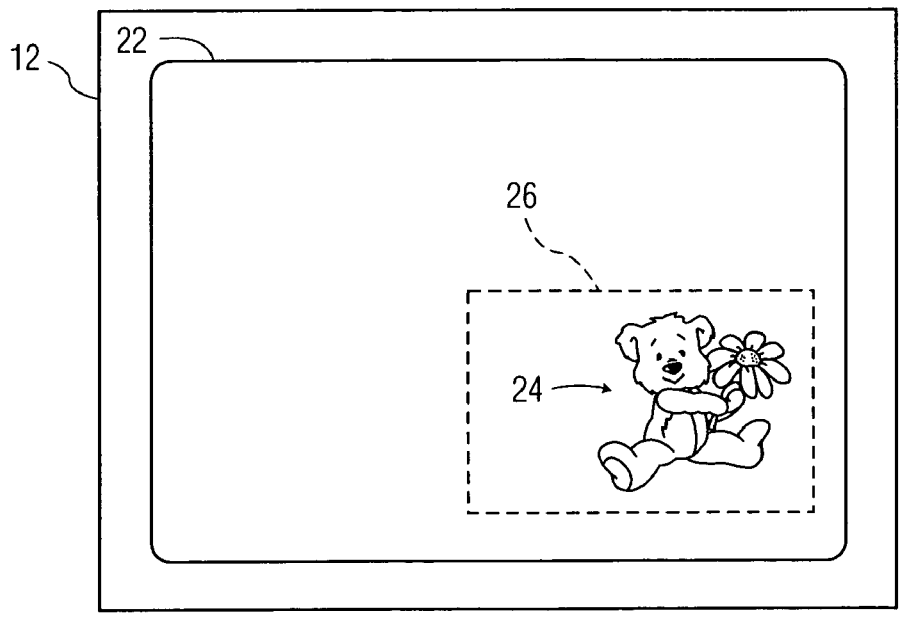
FIG. 2 is a schematic illustration of a sample display on a display device, with a virtual creature displayed in a window.

FIG. 2 depicts a sample display that appears on the monitor 12. In this embodiment, the display includes a first region 22 where the program being watched by the user is displayed. Preferably, when a program is displayed in the first region 22, the program looks the same as it would on a conventional television screen. A virtual creature 24 is displayed within a window 26 contained within the first region 22. This virtual creature 24 is generated by the VCG 10 (shown in FIG. 1) by controlling the audio and video signals that are fed into the monitor 12.

The optional confinement of the virtual creature 24 to the window 26 simplifies generation of the appropriate image because the portions of the window 26 that lie outside of the virtual creature 24 may be filled in with any desired background scene. In an alternative embodiment, the window 26 is omitted, and the virtual creature 24 is generated directly on top of the program being watched by the user, with no intervening background; in other words, a full-screen mode.

Optionally, the virtual creature 24 may be a depiction of any kind of animate being or creature, including a human being. In addition, the virtual creature 24 may be a depiction of what are normally inanimate objects, such as a toaster. Such normally inanimate objects may be animated by giving them eyes and a mouth or by causing their inherent functions to take communicative roles, such as popping toast when a sudden event is identified in video stream of the receiver 14.

Figure 3:
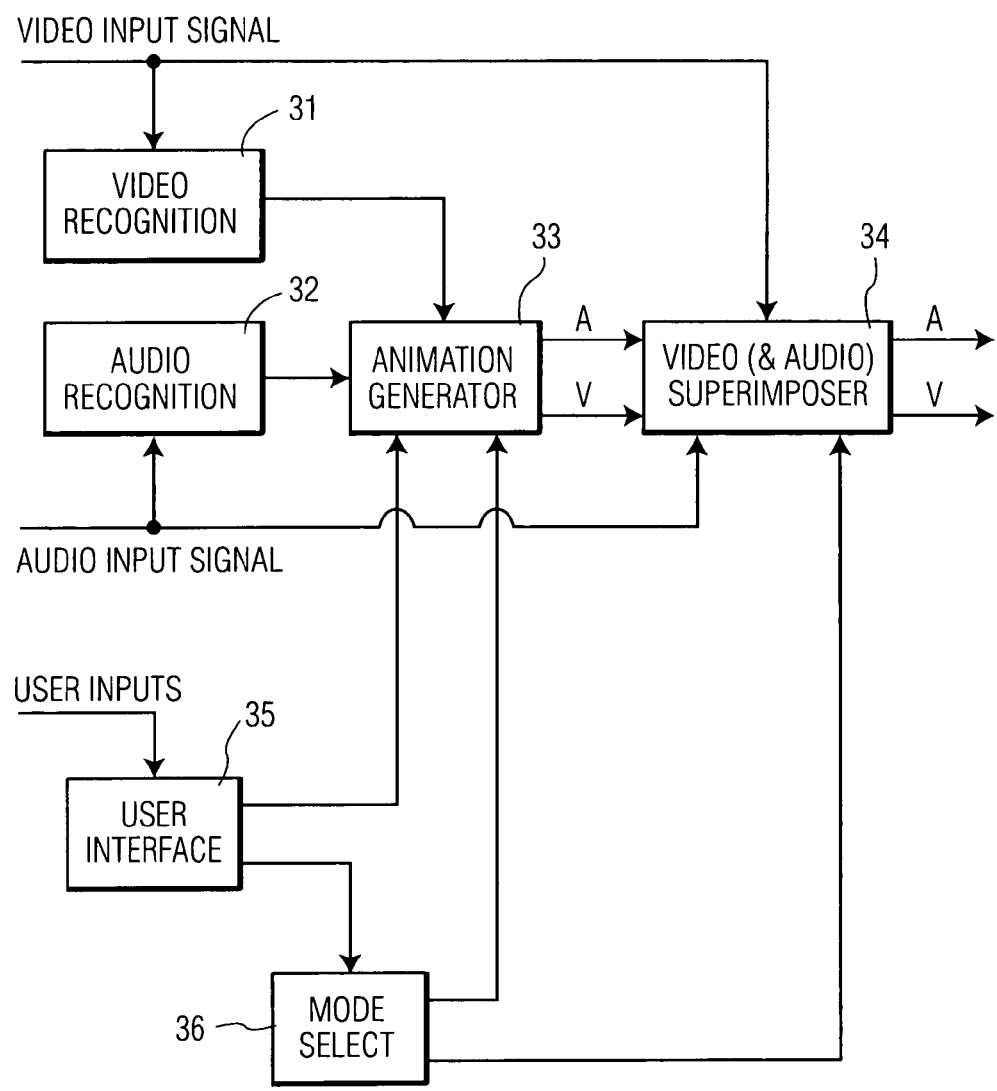
FIG. 3 is a block diagram showing details of the virtual creature generator of FIG. 1.

FIG. 3 is a block diagram of a preferred embodiment for implementing the VCG 10 of FIG. 1. The VCG 10 includes an animation generator 33 that generates audio and video data, which are used to form the virtual creature 24. The details for implementing the animation generator 33 may be in accord with any of a variety of techniques well known to those skilled in the art. The audio and video output generated by the animation generator 33 makes the virtual creature 24 appear in various states of animation. Optionally, the animation generator 33 may generate audio output that is used to create sound effects and speech. The animation generator 33 may be configured to provide a conversation simulator process to simulate conversation between the user and the virtual creature 24.

The video and audio outputs of the animation generator 33 is applied to a video & audio superimposer 34. The video & audio superimposer 34 also receives the video-input signal that corresponds to a program being watched by the user. For the portions of the frame that correspond to the first region 22 (shown in FIG. 2), the video & audio superimposer 34 merely passes the video input signal to the output of the video & audio superimposer 34. However, when the video & audio superimposer 34 recognizes that a current portion of the frame corresponds to the window 26 (shown in FIG. 2) the video & audio superimposer 34 selects the video signal generated by the animation generator 33. This causes the virtual creature 24 to appear superimposed on the first region 22.

In an alternative embodiment, the video & audio superimposer 34 may be implemented using conventional picture-in-picture technology. In this case, the virtual creature 24 would appear within the window 26 somewhere within the first region 22 using any of a variety of techniques well known to those skilled in the art. Alternatively, the virtual creature 24 may be presented in full-screen mode (not shown) as well.

When optional sound effects for the virtual creature 24 are implemented, the video & audio superimposer 34 also combines the audio input signal corresponding to the program being watched with an audio signal from the animation generator 33 (e.g., by mixing the source audio and the animation audio together). The resulting combined audio signal is then converted to an audible sound using any conventional audio amplifier and speaker arrangement.

In its quiescent state, the animation generator 33 preferably paints the virtual creature 24 on the display with a non-intrusive animation such as an occasional shuffle or other slow movement. In response to certain events, the animation generator 33 animates the virtual creature 24 in a manner that is appropriate for the event. Preferably, the events are detected based on the audio input and/or the video input arriving from the signal source.

Normally, while serving as a viewing companion, the virtual creature 24 may be made to appear to face an image in the first region 22 with its back to the user. One of the ways in which the virtual creature 24 may be made to respond to an event is to provide it to give the appearance of turning suddenly toward the user and/or generate a simulated utterance if speech capability is provided.

The video recognition block 31 is used to detect events based on the video input signal that corresponds to the program being displayed on the first region 22 (shown in FIG. 2). Preferably, the video recognition block 31 monitors the video signal and determines when characteristics of the video signal match any predetermined criteria. The video recognition block 31 may operate on any type of video signal (e.g., a composite analog video signal, or a single color component of a digital video signal). It may be implemented using suitable analog circuitry or digital signal processing circuitry, in order to detect characteristics of the signal that correspond to the desired events. It may use any machine classification technique such as Bayesian or neural network-based techniques.

Whenever a feature of the video signal is identified, the video recognition block 31 may provide a suitable output to the animation generator 33. For example, the video recognition block 31 could be programmed to detect when a scene changes from a very dark scene to a very bright scene (e.g., by detecting a large first derivative of a brightness signal), and to provide a DARK_TO_LIGHT signal to the animation generator 33 in response. More sophisticated digital techniques may be used to recognize text or faces in the video image. In response to receipt of a signal indicating a recognized feature, the animation generator 33 may generate an appropriate animation. For example, if the DARK_TO_LIGHT signal is generated, the virtual creature 24 may be animated to give the appearance of putting on a pair of sunglasses. In another example, the video recognition block 31 may be programmed to detect when a large amount of water appears in the scene and to provide a WATER_PRESENT signal to the animation generator 33. In response to receipt of this signal, the animation generator 33 could cause the virtual creature 24 climb into a boat. Any suitable format may be used for sending the signals from the video recognition block 31 to the animation generator 33, including hard-wiring a dedicated line for each signal, or passing the signal to the animation generator 33 as digital data over a bus. Default events may be generated periodically, such as when no features have been recognized for a long time, the virtual creature 24 could be animated to give the impression of being bored or going to sleep. Inputs from the user may provide a signal that the user has left the room (for example, if one of the inputs is from a proximity detector, video classifier, etc.) which may be used to signal an animation, such as giving the virtual creature 24 the impression of looking to see where the user went or of welcoming the user back upon return.

In an alternative embodiment, instead of operating by analyzing the actual video information being displayed in the first region 22 of the monitor 12, the video recognition block 31 may operate on non-video information contained within the video-input signal. For example, animation control information may be inserted into the vertical blanking period of the video-input signal. This information may optionally be of a type that does not produce any change in the first region 22 image, but could be extracted and used to control animation of the virtual creature 24.

An audio recognition block 32 may be provided to detect features in the audio signal that corresponds to a program being watched by the user. The audio recognition block 32 monitors the audio input signal and detects predetermined characteristics of the sound represented by the audio signal. It may be implemented using suitable analog circuitry or digital signal processing methods, to detect characteristics of the signal that correspond to predetermined events. The audio recognition block 32 generates a signal to indicate when any of the predetermined events has occurred. In response to a signal that indicates the recognition of a predetermined event, the animated generator 33 may animate the virtual creature 24 in a corresponding manner. For example, if the audio recognition block 32 detects a sudden loud noise, the audio recognition block 32 could send a SUDDEN_NOISE signal to the animation generator 33. In response to receipt of this signal, the animation generator 33 may generate an appropriate animation, such as animating to give the impression the virtual creature 24 took on a look of surprise (e.g., by jumping backwards). Alternatively, if the audio recognition block 32 detects the sound of a human scream, a SCREAM signal could be sent to the animation generator 33. In response, the animation generator 33 may generate an appropriate animation, such as causing the virtual creature 24 to be animated to give the impression that it is cowering in fear. Any suitable format may be used for sending the signals from the audio recognition block 32 to the animation generator 33, including hard-wiring a dedicated line for each signal, or passing the signals to the animation generator 33 as digital data over a bus.

In an alternative embodiment, instead of using both a video recognition block 31 and an audio recognition block 32, either one of these blocks may be omitted, and the remaining block may be relied upon to recognize the appropriate events from a single source.

Preferably, the user may also interact with the virtual creature 24 via a user interface 35. Examples of suitable user interface devices include microphones, video cameras, and photo detectors. For example, the user may interface with the animation generator 33 by speaking into a microphone, by moving in the vicinity of a video camera, or by pressing buttons. Dedicated hardware may be provided for this purpose, as in the prior art Fin fin. A chatterbot interface may be used to generate responses to speech. Alternatively, the virtual creature 24 may play games involving gestures with the user, the gestures being recognized by a video camera (not shown) in the user interface 35. Alternatively, an infrared transmitter (not shown separately) that transmits codes to an infrared receiver may be used. This approach is particularly well suited to embodiments where the present invention is integrated into a single cabinet together with the monitor being used to display the television program. In a preferred embodiment, the virtual creature 24 is implemented using "artificial life" technology (such as the systems implemented in Fin fin or Tamagotchi) so that virtual creature 24 can adapt based on interactions with the user. Optionally, inputs received via the user interface 35 may be processed by the audio and video recognition blocks 32 and 31 thereby using the same algorithms as those used to respond to events in the video and audio signals that result in animation of the virtual creature 24.

Returning now to FIG. 2 and referring also to FIG. 1, the virtual creature 24 may be implemented to operate in a plurality of different modes, depending on what the user is doing. In a first mode, when the user is watching television, the virtual creature 24 serves as a viewing companion within the window 26 contained on the first region 22 (or directly on top of the first region 22). In a second operation mode, the virtual creature 24 acts as a user interface assistant in connection with the program recommendation system 18. In a third mode, the user interacts with the virtual creature 24 even though he/she is not watching television. (In a manner similar to interaction with the prior art Fin fin and Tamagotchi devices). In this third mode, the user may be provided with an option to leave the virtual creature 24 in the 26, or to display the virtual creature 24 in full-screen mode filling the entire screen of the monitor 12.

Returning now to FIG. 3, the operating mode is preferably determined inferentially by a mode selector 36 by monitoring commands received from the user via the user interface 35. In alternative embodiments, the operating mode may be selected manually by the user by providing explicit commands via the user interface 35. In addition to mode selection, the user interface 35 may be used to set various user options so as to customize each user's virtual creature 24 experience. For example, the user may be provided with a choice of different animals or other creatures that will serve as the virtual creature 24 (e.g., a bird, a dog, or a cat). The user may also be provided with the ability to set the size and position of the creature on the display, as well as the duration of the animated sequences that are generated in response to detected events. Optionally, a user interface menu may be displayed on the monitor 12 (shown in FIG. 2) for the purposes of setting any user-controllable options.

Figure 4:
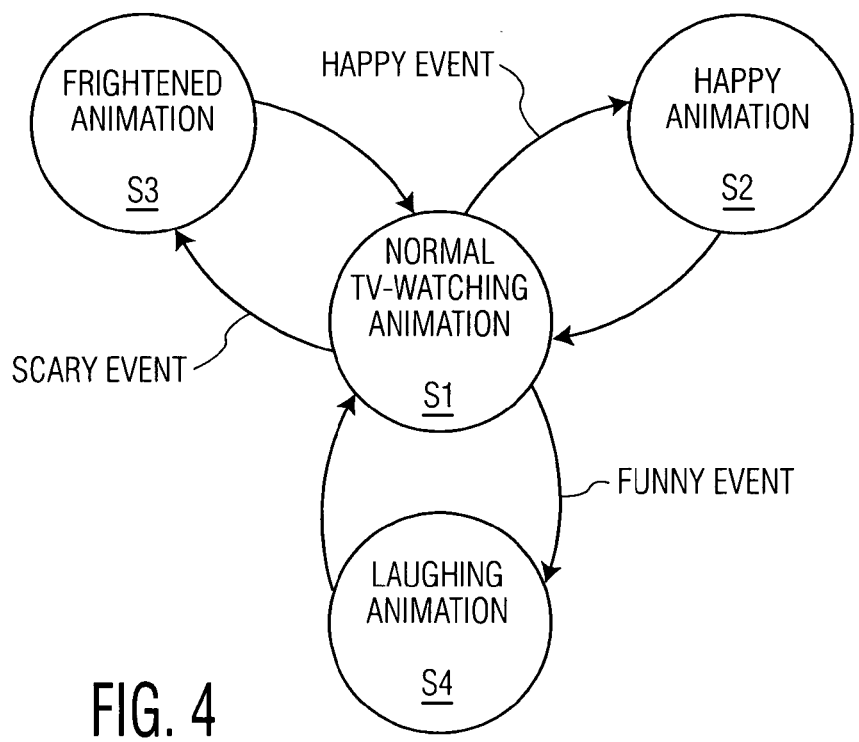
FIG. 4 is a state-transition chart depicting a first operating mode of an embodiment of the present invention.

FIG. 4 is an example of a state flow diagram representing a suitable process for use in controlling the viewing companion mode (i.e., while the user is watching television). In this mode, the virtual creature 24 is ordinarily in the default state S1, where a default animation for the virtual creature 24 is being generated by the animation generator 33. Preferably, the activity level for the virtual creature 24 in the default state S1 is relatively low. Examples of suitable animations for this state include remaining still or shuffling slightly every few seconds. In the preferred embodiment, when a virtual creature 24 is being displayed in the default state S1, the virtual creature's 24 back is seen by the television viewer to create the appearance that the virtual creature 24 is watching the same program as the viewer.

When events are signaled, the state of the virtual creature 24 switches to one of a plurality of different states. The events may be detected by the video recognition block 31, the audio recognition block 32, and/or the user interface 35 (as described above in connection with FIG. 3). In the illustrated example, the detection of a happy event (e.g., a bright and sunny scene) causes a transition to state S2, where a happy animation (e.g., a smile) is generated by the animation generator 33; the detection of a scary event (e.g., a human scream) causes a transition to state S3, where a frightened animation (e.g., cowering) is generated by the animation generator 33; and the detection of a funny event (e.g., a laughing sound) causes a transition to state S4, where a laughing animation is generated by the animation generator 33. Of course, the system may be programmed to recognize and react to other events in addition to, or instead of, the three illustrated events.

When a detected event has ended (or alternatively after a predetermined time period has elapsed) the virtual creature 24 returns to the default state S1 (for TV watching). In embodiments where the virtual creature 24 sits with its back facing to the viewer in the default S1, the animation in each of the alternate states S2–S4 is preferably programmed so that the virtual creature 24 is animated to give the appearance of turning around and facing the viewer.

Recommendation systems obtain and track information about which shows the viewer likes to watch (either in real time, by observing actual viewing patterns, or in a batch mode using a suitable program guide). Once a user's viewing preferences have been determined, new program selections can be compared to the stored history of program selections. When a selected program differs markedly from previously selected programs (e.g., if all prior selections were for sports events, and a user chooses to watch or record the Oprah show), the user may appreciate a negative reaction by the system (e.g., an animated grimace or expression of surprise). Similarly, if the same user selects a very popular sporting event, the user may appreciate a positive reaction (e.g., an animated thumbs-up).

Figure 5:
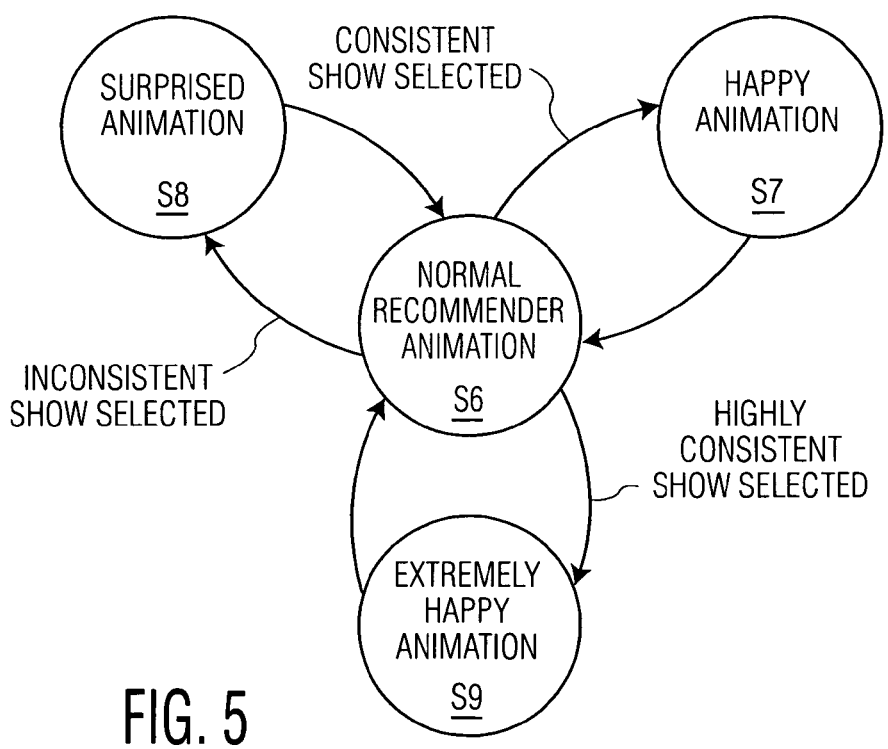
FIG. 5 is a state-transition chart depicting a second operating mode of an embodiment of the present invention.

FIG. 5 is an example of a suitable state flow diagram for use in the program recommendation mode (i.e., while the user is interacting with the program recommendation system 18). In this mode, the virtual creature 24 is ordinarily in the default state S6, where a default recommender animation for the virtual creature 24 is being generated by the animation generator 33. When a new selection is made, the system compares the new selection to the history of past selections. The animation generator 33 then animates the virtual creature 24 to react to the new selection.

In the illustrate example, when the new selection is generally consistent with the selection history, a transition to state S7 occurs, where a happy animation (e.g., a smile) is generated by the animation generator 33; when the new selection is inconsistent with the selection history, a transition to state S8 occurs, where a surprised animation (e.g., fainting) is generated by the animation generator 33; and when the new selection is very consistent with the selection history, a transition to state S9 occurs, where an extremely happy animation (e.g., jumping for joy) is generated by the animation generator 33.

The above-described processes may optionally be implemented by a suitably programmed microprocessor and/or digital signal processor, with its program stored on suitable data storage media (e.g., solid state memory or on a magnetic disc or tape).

When the above-described embodiments are incorporated into a portable TV (not shown as a separate embodiment), the portable TV showing the virtual creature 24 may be used as a viewing companion to provide an illusion that the portable TV is watching another traditional TV together with the viewer. The same video signal can be applied simultaneously to both TVs and some mechanism provided to indicate that the portable TV is serving as a viewing companion and not as a simultaneous display of broadcast content and the virtual creature 24.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

What is claimed is:

1. A method of providing an animated viewing companion on a display while a viewer is watching a program, the method comprising the steps of:
    displaying a video program on the display;
    generating an animated character on a portion of the display as the animated viewing companion;
    monitoring at least one signal corresponding to the program being watched;
    determining, based on the monitoring performed in the monitoring step, when a first predetermined event has occurred;
    wherein the first predetermined event comprises at least one of an audio and video event in the program being watched; and
    controlling the animated character based on the determination made in the determining step so that the animated character responds to the at least one of an audio and video event in the program being watched by transitioning from a normal TV-watching animation to an animation wherein its face faces the viewer.

2. The method of claim 1, further comprising the step of:
    determining, based on the monitoring performed in the monitoring step, when a second predetermined event has occurred,
    wherein, in the controlling step, control of the animated character is also based on the determination that the second predetermined event has occurred.

3. The method of claim 1, wherein, in the displaying step, the video program is displayed in a first predetermined region of the display, and wherein, in the generating step, the animated character is generated in a second predetermined region of the display.

4. The method of claim 1, wherein the at least one signal monitored in the monitoring step comprises an audio signal.

5. The method of claim 1, wherein the at least one signal monitored in the monitoring step comprises an audio signal and a video signal.

6. The method of claim 1, wherein the at least one signal monitored in the monitoring step comprises a video signal.

7. The method of claim 1, further comprising the steps of:
    accepting at least one input from the user; and
    controlling the animated character based on the inputs accepted in the accepting step.

8. The method of claim 1, wherein a behavior of the animated character depends on a cumulative history of inputs accepted from the user.

9. The method of claim 1, wherein:
    the animation wherein the face faces the viewer comprises one of a frightened animation, a happy animation, and a laughing animation.

10. A method of providing an animated viewing companion on a display while a viewer is watching a program, the program having an audio component and a synchronized video component, the method comprising the steps of:

displaying the video component of the program on the display;

generating an animated character on a portion of the display as the animated viewing companion;

determining, based on a signal corresponding to at least one of the audio and video components in the program being watched, when a first predetermined event has occurred; and controlling the animated character based on the determination made in the determining step so that the animated character responds to the at least one of an audio and video event in the program being watched by transitioning from a normal TV-watching animation to an animation wherein its face faces the viewer.

11. The method of claim 10, wherein the signal corresponding to the audio component of the program is an analog signal.

12. The method of claim 10, wherein the first predetermined audio event comprises a sudden loud sound, and wherein, based on the determination of when the first predetermined audio event has occurred, the animated character is controlled, in the controlling step, to act surprised.

13. The method of claim 10, wherein the first predetermined audio event comprises a laughing sound, and wherein, based on the determination of when the first predetermined audio event has occurred, the animated character is controlled, in the controlling step, to laugh.

14. The method of claim 10, wherein:

the animation wherein the face faces the viewer comprises one of a frightened animation, a happy animation, and a laughing animation.

15. A method of providing an animated character on a display while a viewer interfaces with a program recommendation system, the method comprising the steps of:

generating an animated character on the display as an animated viewing companion;

accepting a selection of a program from a user;

comparing the selection accepted in the accepting step to a stored profile, wherein the stored profile is based on previously made program selections; and controlling the animated character based on the comparison made in the comparing step to transition from a normal TV-watching animation to an animation wherein its face faces the viewer and expresses an approval response when it is determined, in the determining step, that the selection is consistent with the stored profile.

16. The method of claim 15, wherein, a degree of consistency of the selection with the stored profile is determined in the determining step; and wherein, in the controlling step, the animated character is controlled to generate one of a plurality of approval responses indicating different degrees of approval depending on the degree of consistency of the selection with the stored profile.

17. The method of claim 15, wherein the comparing step comprises the step of determining whether the selection accepted in the accepting step is inconsistent with the stored profile; and wherein, in the controlling step, the animated character is controlled to generate a disapproval response when it is determined, in the determining step, that the selection is inconsistent with the stored profile.

18. The method of claim 15, wherein the comparing step comprises the step of determining whether the selection accepted in the accepting step is inconsistent with the stored profile; and wherein, in the controlling step, the animated character is controlled to generate a disapproval response when it is determined, in the determining step, that the selection is inconsistent with the stored profile.

\* \* \* \* \*